(12) United States Patent
Islam et al.

(10) Patent No.: US 10,594,465 B2
(45) Date of Patent: Mar. 17, 2020

(54) SYSTEM AND METHOD FOR FLEXIBLE CHANNELIZATION

(71) Applicant: Huawei Technologies Co., Ltd., Shenzhen (CN)

(72) Inventors: Toufiqul Islam, Ottawa (CA); Alireza Bayesteh, Ottawa (CA); Kelvin Kar Kin Au, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 63 days.

(21) Appl. No.: 15/399,697

(22) Filed: Jan. 5, 2017

(65) Prior Publication Data

US 2017/0244535 A1  Aug. 24, 2017

Related U.S. Application Data

(60) Provisional application No. 62/298,156, filed on Feb. 22, 2016.

(51) Int. Cl.
| | |
|---|---|
| *H04L 5/00* | (2006.01) |
| *H04L 1/00* | (2006.01) |
| *H04B 7/26* | (2006.01) |
| *H04W 72/12* | (2009.01) |
| *H04L 27/26* | (2006.01) |

(52) U.S. Cl.
CPC ......... *H04L 5/0058* (2013.01); *H04B 7/2615* (2013.01); *H04L 1/0003* (2013.01); *H04L 5/0014* (2013.01); *H04L 5/0028* (2013.01); *H04L 5/0037* (2013.01); *H04L 27/2602* (2013.01); *H04W 72/1263* (2013.01); *H04L 1/0048* (2013.01); *H04L 5/0073* (2013.01); *H04L 5/0092* (2013.01)

(58) Field of Classification Search
None
See application file for complete search history.

(56) References Cited

U.S. PATENT DOCUMENTS

| | | | |
|---|---|---|---|
| 8,400,998 B2* | 3/2013 | Kuchibhotla | H04W 72/0406 370/348 |
| 10,299,283 B2* | 5/2019 | Islam | H04W 72/04 |
| 10,440,742 B2* | 10/2019 | Sun | H04W 74/02 |
| 2009/0135713 A1* | 5/2009 | Hwang | H04L 5/0037 370/210 |

(Continued)

FOREIGN PATENT DOCUMENTS

| | | |
|---|---|---|
| CN | 101465688 A | 6/2009 |
| CN | 104869094 A | 8/2015 |

(Continued)

OTHER PUBLICATIONS

XP051043758 RWS-150006 Huawei Technologies,"Vision on 5G Radio Access Technologies",3GPP RAN workshop on 5G Sep. 17-18, 2015 Phoenix, USA,total 18 pages.

(Continued)

*Primary Examiner* — Steve R Young
(74) *Attorney, Agent, or Firm* — Slater Matsil, LLP

(57) ABSTRACT

Systems and methods for flexible channelization are provided. Different TU sizes are used for transmissions by different UEs. The different UEs may use different access schemes, and may transmit using time frequency resources that at least partially overlap.

30 Claims, 11 Drawing Sheets

(56) References Cited

U.S. PATENT DOCUMENTS

| | | | | |
|---|---|---|---|---|
| 2013/0115967 A1* | 5/2013 | Soliman | ............... | H04W 16/02 |
| | | | | 455/452.1 |
| 2014/0098782 A1* | 4/2014 | Shirazi | ............... | H04J 13/0003 |
| | | | | 370/330 |
| 2014/0198742 A1 | 7/2014 | Baldemair et al. | | |
| 2014/0254544 A1* | 9/2014 | Kar Kin Au | ......... | H04L 5/0033 |
| | | | | 370/330 |
| 2015/0256308 A1 | 9/2015 | Ma et al. | | |
| 2016/0174230 A1 | 6/2016 | Benjebbour et al. | | |
| 2017/0156140 A1 | 6/2017 | Islam et al. | | |
| 2018/0054275 A1* | 2/2018 | Kimura | ................... | H04L 27/01 |
| 2019/0045506 A1* | 2/2019 | Takeda | ............. | H04W 72/0446 |

FOREIGN PATENT DOCUMENTS

| | | |
|---|---|---|
| JP | 2015188268 A | 10/2015 |
| WO | 2012104630 A1 | 8/2012 |
| WO | 2014208140 A1 | 12/2014 |
| WO | 2015131827 A1 | 9/2015 |

OTHER PUBLICATIONS

Wei, D. et al., "Weighted message passing algorithm for SCMA", 2015 International Conference on Wireless Communications and Signal Processing(WCSP), 2015, 5 pages.

Ma, J., "Software Defined Air Interface,—Air interface Design Paradigm Shift for 5G", Dec. 2014, 15 pages.

\* cited by examiner

SYSTEM AND METHOD FOR FLEXIBLE CHANNELIZATION

CROSS REFERENCE

The present application claims the benefit of U.S. Provisional Application Ser. No. 62/298,156, entitled "System and Method for Flexible Channelization", filed on Feb. 22, 2016, the entire contents of which are incorporated herein by reference.

FIELD

The application relates to systems and methods of channelization for wireless communications.

BACKGROUND

Different non-orthogonal multiple access schemes have been provided that include sparse code multiple access (SCMA), multi-user shared access (MUSA), pattern division multiple access (PDMA), and resource spread multiple access (RSMA) among others. SCMA, for example, employs sparse spreading of information symbols over OFDM sub-carriers for overloading and low complexity decoding. SCMA is non-orthogonal in the sense that content for multiple UEs is transmitted in the same time frequency resource, with the content for different UEs separated through non-orthogonal spreading codes. These schemes are typically used with a fixed channelization scheme. For example, in existing approaches the unit of channelization for SCMA, in particular for grant-free access, is a fixed size contention based transmission unit (CTU). A CTU is defined as a time/frequency/code/pilot symbol combination.

The use of fixed channelization, for example fixed size CTUs, may not result in the best use of resources, for example where an actual amount of data is very small.

SUMMARY

Systems and methods for flexible channelization are provided. Different TU sizes are used for transmissions by different UEs. The different UEs may use different access schemes, and may transmit using time frequency resources that at least partially overlap.

According to one aspect of the present invention, there is provided a method in an access network comprising: within a system bandwidth, assigning a first time-frequency resource based on a first transmit unit (TU) size as a minimum scheduling unit for transmissions to a first UE, and a second time-frequency resource based on a second TU size as a minimum scheduling unit for transmissions to a second UE, the second TU size having a different time duration from the first TU size, and receiving from the first UE within the first time-frequency resource, and receiving from the second UE within the second time-frequency resource.

In some embodiments, the assignment of the first time-frequency resource based on the first TU size is for a first access scheme, and the assignment of the second time-frequency resource based on the second TU size is for a second access scheme.

In some embodiments, at least one of the first and second access schemes is a non-orthogonal multiple-access scheme.

In some embodiments, the non-orthogonal multiple-access scheme uses spreading of a data symbol over multiple resource elements.

In some embodiments, the method further comprises at least one of: transmitting signalling indicating the first TU size in time and/or frequency; and transmitting signalling indicating the second TU size in time and/or frequency.

In some embodiments, at least one of: the first TU size is signalled statically, semi-statically, or dynamically; and the second TU size is signalled statically, semi-statically, or dynamically In some embodiments, the first TU size is different from the second TU size.

In some embodiments, the first access scheme is grant-based and the second access scheme is grant-free.

In some embodiments, the first access scheme is orthogonal frequency division multiple access (OFDMA), and the second access scheme is a non-orthogonal multiple access scheme.

In some embodiments, the non-orthogonal multiple access scheme is one of SCMA (sparse code multiple access), pattern division multiple access (PDMA), multi-user shared access (MUSA), and resource spread multiple access (RSMA).

In some embodiments, receiving using the second access scheme comprises using spreading blocks having a spreading block size, and the second time-frequency resource has a useful size that is an integer multiple of a spreading block size.

In some embodiments, the first time-frequency resource is an integer multiple of a transmit unit size for the first access scheme.

In some embodiments, at least some of the time: the first time-frequency resource and the second time-frequency resource are disjoint.

In some embodiments, the first time-frequency resource partially overlaps with the second time-frequency resource.

In some embodiments, at least some of the time: all of the second time-frequency resource overlaps with the first time-frequency resource.

In some embodiments, the transmissions to the first UE use a first numerology, and the transmissions to the second UE use a second numerology different from the first numerology.

In some embodiments, the first time-frequency resource is statically assigned, semi-statically assigned, or dynamically assigned; the second time-frequency resource is statically assigned, semi-statically assigned, or dynamically assigned.

In some embodiments, the method further comprises: transmitting signaling containing definitions of the time-frequency resources.

In some embodiments, the method further comprises: performing joint decoding for overlapping time-frequency resources.

In some embodiments, the method further comprises: using a message passing algorithm to decode the transmission of the second access scheme; subtracting an interference component based on a result of the decoding of the transmission of the second access scheme; decoding the transmission of the second access scheme.

According to another aspect of the present invention, there is provided a base station configured to implement one of the methods summarized above or described herein.

According to yet another aspect of the present invention, there is provided a method in a user equipment (UE), the method comprising: the UE transmitting using a first access scheme within a first time-frequency resource based on a first transmit unit (TU) size as a minimum scheduling unit for transmissions by the UE; wherein the first time-frequency resource overlaps at least partially with a second time-frequency resource based on a second TU size as a minimum scheduling unit for transmissions by another UE using a second access scheme, the second TU size having a different time duration from the first TU size.

In some embodiments, the method further comprises: receiving an assignment of the first time-frequency resource based on the first TU size.

In some embodiments, at least one of the first and second access schemes is a non-orthogonal multiple-access scheme.

In some embodiments, the non-orthogonal multiple-access scheme uses spreading of a data symbol over multiple resource elements.

In some embodiments, the method further comprises receiving signalling indicating the first TU size in time and/or frequency.

In some embodiments, the first TU size is signalled statically, semi-statically or dynamically.

In some embodiments, the first TU size is different from the second TU size.

In some embodiments, the first access scheme is grant-based and the second access scheme is grant-free.

In some embodiments, the first access scheme is orthogonal frequency division multiple access (OFDMA), and the second access scheme is a non-orthogonal multiple access scheme.

In some embodiments, the non-orthogonal multiple access scheme is one of SCMA (sparse code multiple access), pattern division multiple access (PDMA), multi-user shared access (MUSA), and resource spread multiple access (RSMA).

According to still another aspect of the present invention, there is provided a user equipment configured to implement one of the methods summarized above or described herein.

BRIEF DESCRIPTION OF THE DRAWINGS

Embodiments of the invention will now be described with reference to the attached drawings in which.

DETAILED DESCRIPTION

Figure 1A:
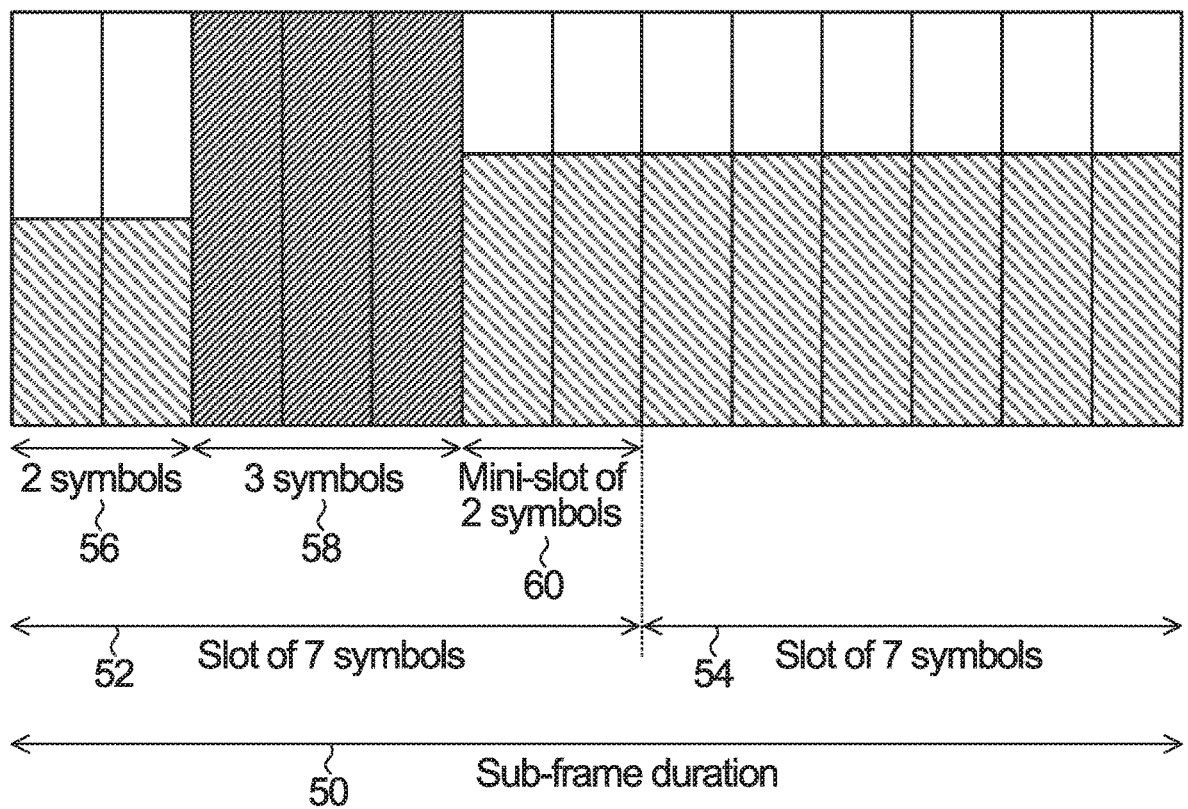
FIG. 1A shows an example of slot and mini-slot aggregation.

Systems and methods have been provided for resource block channelization for orthogonal frequency division multiplexing (OFDM)-based numerologies. For example, the number of tones per resource block can be varied across time and/or system bandwidth. See, for example, commonly assigned co-pending U.S. application Ser. No. 14/952,983 filed Nov. 26, 2015, and entitled "Resource Block Channelization for OFDM-based Numerologies", hereby incorporated by reference in its entirety.

In these methods, resource blocks are defined with a configurable resource block bandwidth and/or a configurable number of tones. Channelization is orthogonal in the sense that each resource block occupies a dedicated time frequency resource.

Systems and methods are provided that in some embodiments may offer a flexible channelization in support of grant-based and grant-free access schemes for uplink transmission. The minimal unit of transmission resource allocation for an access scheme is referred to herein as a transmission unit (TU). The TU definition can be different for different access schemes. Some embodiments feature one or a combination of:

TU formulation, in terms of one or more of bandwidth (number of sub-carriers), time (number of OFDM symbols), and number of resource units (e.g. multiple resource blocks, although a TU could be as small as one resource unit or block);

scalable relationship between TU size and spreading factor;

co-existence of different TU sizes; and various applications for such flexible channelization schemes.

In some embodiments, a frame structure is employed in which a set of time slots (or simply slots) makes up a sub-frame, and multiple sub-frames make up a frame. In some embodiments, the slot is the minimum time duration for scheduling purposes. In this case, a TU has the same number of symbols as a slot. Each slot may contain multiple OFDM symbols; the number of OFDM symbols in a slot may depend on the length of a cyclic prefix used.

In some embodiments, a frame structure is employed in which a set of time slots makes up a sub-frame, and multiple sub-frames make up a frame, and in which slots may be further sub-divided into mini-slots, although more generally mini-slots may be defined that may or may not be a sub-division of a slot. For example, in some embodiments, a mini-slot may cross a slot boundary. Where mini-slots are employed, at least for some UEs (namely UEs that support mini-slots), the mini-slot is the minimum time duration for scheduling purposes. In some embodiments, scheduling is performed using aggregated slots or mini-slots. In some embodiments, the slot and mini-slot are two independent longer and shorter scheduling granularities.

In some embodiments, different scheduling unit durations can coexist within a frame structure. For example, the mini-slot can co-exist with the slot within a frame structure. In some embodiments, TU channelization is configured to facilitate this coexistence.

Flexible Channelization

The size of the TU is configurable in time and frequency. An allocation of resources for uplink transmission may include an integer number of TUs. In some embodiments, some TUs are made of a combination of one or more smaller resource units, analogous to the LTE resource block construct, but these smaller resource units are not allocated separately. In some embodiments, flexible channelization is applied for access schemes including one or both of grant-based access schemes and grant-free access schemes, such as a non-orthogonal multiple access scheme involving spreading. In a specific example, the access schemes include a grant-based access scheme based on orthogonal frequency division multiple access (OFDMA) and a grant-free access scheme based on SCMA, but the approaches provided herein are not limited to these specific schemes. For example, an orthogonal access scheme such as OFDMA could be used for the grant-free access scheme. For a TU to be transmitted using SCMA, the TUs may be analogous to the above-referenced CTUs, although a CTU may consist of one or multiple TUs. If OFDMA is employed for grant-free access, a TU may be analogous to TUs used in a grant-based access scheme. Furthermore, CTUs may consist of one or multiple TUs, if a uniform definition of TU is adopted for both grant-based and grant-free. E.g., CTU may span more than 12 sub-carriers etc. More generally, there may be a unified TU definition across multiple access schemes, or there may be different TU definitions for different access schemes.

In some embodiments, the grant-based access scheme is scheduled, and the grant-free access scheme is contention-based.

A TU occupies N sub-carriers (frequency dimension) and M OFDM symbols (time dimension). TUs are defined within a system bandwidth for at least two different access schemes. Within each TU, a respective channelization specific to the access scheme is defined. This may, for example, be employed to provide co-existence of TUs for scheduled transmissions and TUs for grant-free transmissions. For example, scheduled grant-based OFDMA transmissions may co-exist with unscheduled contention-based SCMA transmissions in the uplink. In some embodiments, the at least two different access schemes include both orthogonal and non-orthogonal access schemes. The non-orthogonal scheme may use spreading of a data symbol over multiple resource elements, for example, SCMA, PDMA, MUSA, RSMA or some other non-orthogonal scheme. In some embodiments, the at least two different access schemes include a first non-orthogonal access scheme that does not use spreading of a data symbol over multiple resource elements, and a second non-orthogonal access scheme that does use spreading of a data symbol over multiple resource elements. In the detailed examples below, SCMA is used as the grant-free access scheme. More generally, other grant-based multiple access schemes may be used in place of OFDMA, and other grant-free access schemes for any of the embodiments described herein, such as other non-orthogonal multiple access schemes, may be used in place of SCMA for any of the embodiments described here.

The size of a TU is configurable either on a static, semi-static or fully dynamic basis. Although a TU is a rectangular resource with N sub-carriers by M symbols, multiple TUs can be used to define a grant-based or grant-free region that is not necessarily rectangular.

In some embodiments, the size of a given TU or set of TUs is set at least in part depending on a number of user equipments (UEs) served or contending for the resources. The size may also depend on payload size for the UEs served or contending for the resources, and/or the size may depend on the application(s) that require the resources.

In some embodiments, channelization is performed within a framework of transmission time intervals (TTIs). In some embodiments, a TTI contains P symbols. In some embodiments, P is fixed, or limited to a few specific values. For example, P might be 7 or 14. For the purpose of channelization, for a TTI containing P symbols, a TU can be defined that occupies M=P symbols in the time direction, but TUs can also be defined with M<P symbols. However, where there is a framework of TTIs, the TUs do not cross TTI boundaries. In some embodiments, the TTI is the scheduling interval. However, as noted previously, in other embodiments, the slot or mini-slot or an aggregation of slots or mini-slots, or an aggregation of slots and mini-slots, is the scheduling interval. In some embodiments a TTI corresponds to the duration of a slot or a mini-slot.

In some embodiments, the channelization for a stream of traffic may change multiple times during a scheduling interval. The location of traffic for a stream may hop between multiple time/frequency locations when switching from one channelization to another. In some embodiments, this approach is applied to allow re-transmissions for low latency traffic without acknowledgements (ACKs)/negative ACKs (NACKs), for example transmissions with a fixed number of retransmission attempts. As a specific example, a first grant free transmission may be performed using a 2-symbol mini-slot with a 15 kHz sub-carrier spacing, and this is then followed by a re-transmission using a lower MCS, using a 4 symbol mini-slot with a 15 kHz sub-carrier spacing.

In a specific example, the scheduling interval corresponds to an aggregation of a mini-slot and a slot. An example is depicted in FIG. 1A. Shown is a sub-frame duration 50 of 14 symbols within which two 7-symbol slots 52,54 are defined. Over the first five symbols of slot 52, a 2-symbol mini-slot 56 and a 3 symbol mini-slot 58 are scheduled. Beginning at the 6$^{th}$ symbol, some traffic is scheduled for 9 symbols. The 9 symbols are an aggregation of a mini-slot 60 of 2 symbols and slot 54 of 7 symbols. When there is an aggregation, the aggregated resources are scheduled together. In this example, the mini-slot and the slot are scheduled together. For the aggregation, a TU corresponding to the 2-symbol mini-slot and a TU corresponding to the 7-symbol slot may or may not be in same frequency location.

Figure 1B:
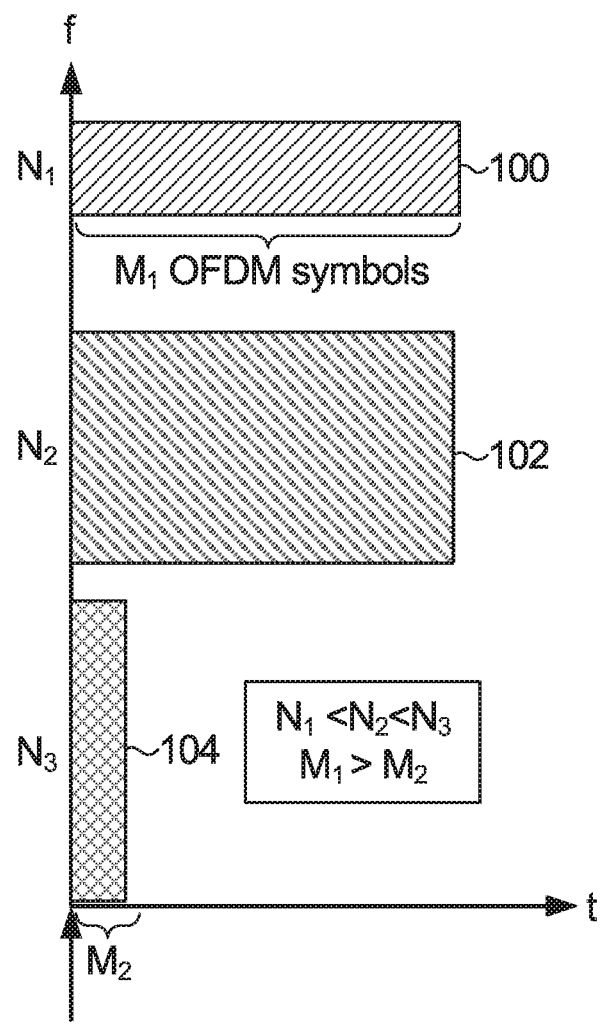
FIG. 1B shows a set of example transmission unit (TU) sizes.

See, for example, FIG. 1B which depicts 3 TU configurations. In the first example 100, a TU is defined with $N_1$ subcarriers by $M_1$ OFDM symbols. In the second example 102, a TU is defined with $N_2$ subcarriers by $M_1$ OFDM symbols. In the third example 104, a TU is defined with $N_3$ subcarriers by $M_2$ symbols. For the example shown, $N_1 < N_2 < N_3$, and $M_1 > M_2$.

In some embodiments, multiple TU sizes (for example, including small and large TUs) are configured to co-exist in the same time-frequency plane with a full or partial overlap in the time frequency plane. This can depend on the applications served and access mechanism (for example OFDMA and/or SCMA).

Figure 2:
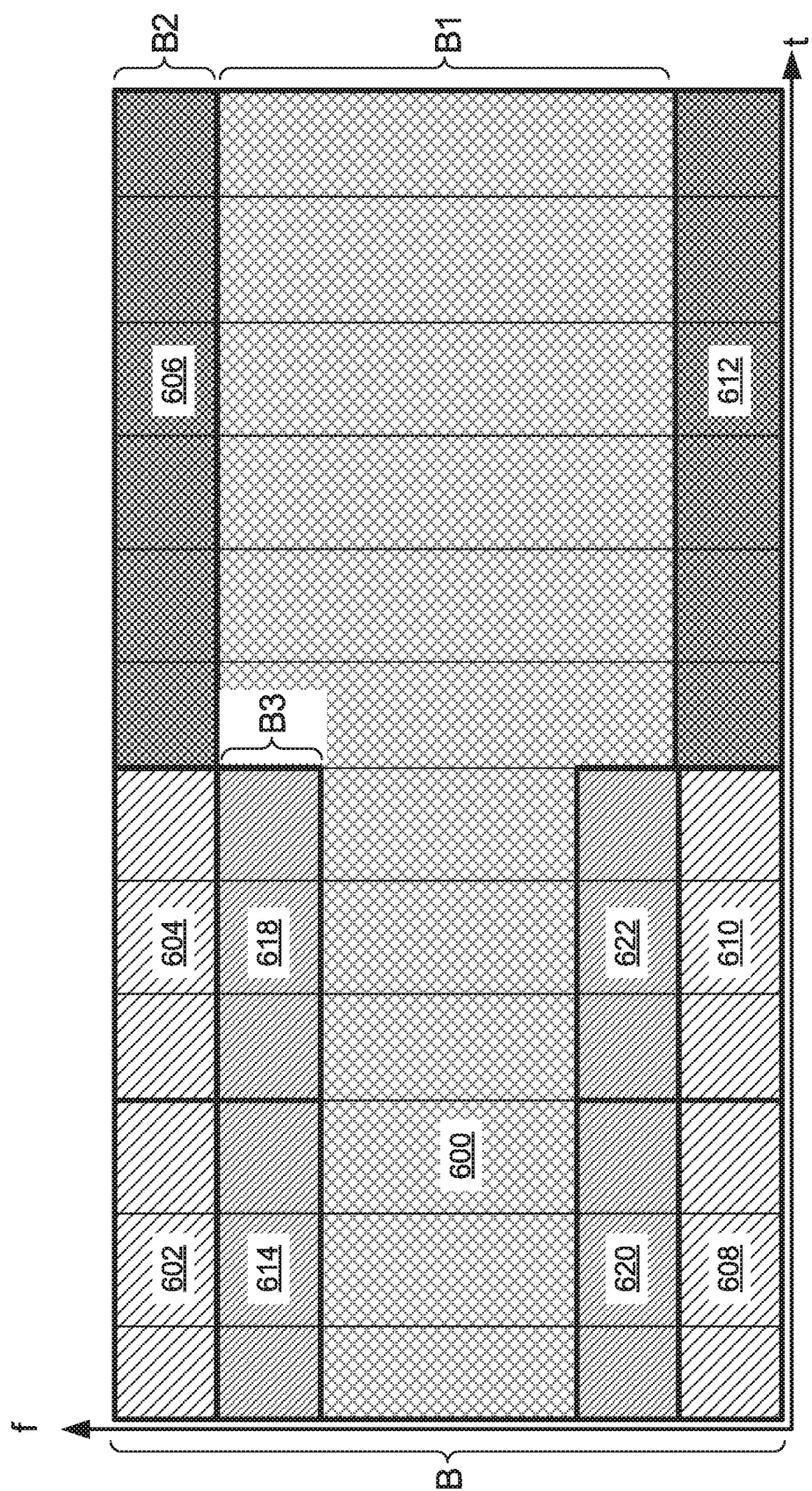
FIG. 2 shows TU size definitions for two access schemes with overlapping allocation in accordance with an embodiment of the invention.

Referring now to FIG. 2, a detailed example of flexible channelization is depicted which involves channelization within a TTI having 12 symbols in the time dimension over a bandwidth B for a given numerology. For the example of FIG. 2, control/headers are not shown, and the blocks are indicative of the relative size of TUs. In the frequency dimension, there are a number of sub-carriers (not shown) with a defined sub-carrier spacing for the numerology employed within the bandwidth B. One row in FIG. 2 may represent one or more sub-carriers, depending upon the TU definition for a given application.

In FIG. 2, there is a TU 600 for scheduled traffic, for example enhanced mobile broadband (eMBB) traffic, TU 600 occupies all 12 OFDM symbols, and occupies a central portion of the bandwidth B with a TU bandwidth of B1. In a specific example, bandwidth B1 contains 12 sub-carriers.

Also shown is TU 602 which is 3 symbols in the time dimension and has a smaller frequency dimension (bandwidth B2) than TU 600. TU 602 is situated at the edge of the bandwidth B. TU 604 is similar to TU 602 in terms of its time and frequency dimensions. TU 606 occupies the same frequency as TUs 602,604 and is twice as large in the time dimension. TUs 608,610,612 are defined similarly at the opposite edge of bandwidth B. TUs 602,604,606,608,610, 612 are not superimposed over the TU for 600, and are appropriate for contention based traffic. Note that in some embodiments, the bandwidth B may be much larger than the bandwidth of individual TUs.

Also shown are TUs 614,618,620,622 which are the same in size as TU 602, but which are superimposed in time frequency over the TU 600 allocated for scheduled traffic. The example of FIG. 2 shows how within a given numerology, there is co-existence of TUs for different access schemes, for example including grant-based and grant-free schemes, with at least some TUs being defined to exist in superimposed time-frequency resources. The TUs for the different access schemes may have the same or different sizes.

With the example of FIG. 2, there are different TU sizes for two different services and there is some overlap. Alternatively, there may be different TU sizes with no overlap.

As noted above, in some embodiments, and for some TUs, channelization is performed for non-orthogonal access with spreading. Spreading can be performed along the frequency dimension, or the time dimension, or within the time/frequency plane.

As defined above, the TU size is $N_{TU}=N \times M$. Each symbol is mapped to a layer of K tones (a tone being a specific sub-carrier for a specific OFDM symbol time period), where K is the spreading factor. Thus, a TU has N×M tones. Multiple layers can be combined additively within the same TU using different spreading codes.

The useful TU size for carrying data, $N_{TU,d}$, is equal to the TU size $N_{TU}$ less any control and pilot signal overhead if present, e.g. pilot symbol and control:

$N_{TU,d}=N_{TU}-\text{overhead}=N \times M-\text{overhead}$

Note that a TU might not contain either or both of pilot symbols and control information. For example, is aggregation is performed as described with above by way of example with reference to FIG. 1A, the control information may be in the form of a common data control information (DCI) in the first slot or mini-slot of the aggregation, in which case the second or subsequent slot or mini-slot does not need control information. The second or subsequent slot or mini-slot may still contain pilot symbols or demodulation reference symbols (DMRS) or more generally whatever uplink transmission is used for the purpose of channel estimation.

A spreading block (e.g. SCMA block) is a set of K tones where layers are mapped. The useful TU size $N_{TU,d}$ must be at least as great as the spreading factor K to accommodate at least one spreading block.

In a specific example, the following channelization constraint is satisfied for TUs assigned to spreading-code based access schemes:

the spreading factor $K=2^n$, where $n=\{1, 2, 3, 4, \ldots\}$, but more generally K need not be a power of 2;

$N_{TU,d}=mK$, i.e., an integer number m of spreading blocks fits within the useful TU size making for a scalable design for the best use of bandwidth;

m=number of information symbols, with each information symbol mapped to a layer of K tones;

one TU has a capacity of m symbols per SCMA layer, and mR symbols where there are R superimposed SCMA layers.

For example, if $N_{TU,d}$ is 20, and K=4, 5 spreading blocks can fit within the TU. If R=4, then 5×4 information symbols can be transmitted.

In another example, K is a power of 2, and $m=2^L$, with the result that $N_{TU,d}=2^{n+L}$.

In some embodiments, a set of TU configurations for OFDMA is provided that features a fixed bandwidth across different numerologies. For example:

N=3, 6, 12, 24 and M=7

M×N={21, 42, 84, 168} tones

Overhead={5, 10, 20, 40} tones (23% overhead)

$N_{TU,d}=\{16, 32, 64, 128\}$ which satisfies the $2^{m+n}$ relationship

N=2, 4, 8, 16 and/or M=3, 6, 12, 24

In some embodiments, TU configurations are provided with a fixed number of sub-carriers or configurable number of sub-carriers. The above calculations can be extended to cover such TU configurations.

Multiple transmission regions of different sizes can be defined for one or more access schemes, based on supported use cases. In some embodiments, multiple contention regions are defined to support different spreading factors and may have different sizes.

Each TU assigned to one access scheme may be assigned a dedicated time frequency resource, or may be partially or fully overlapped with one or more TUs assigned to another access scheme. For example, OFDMA and SCMA may have fully overlapping, partially overlapping or non-overlapping TU assignment, for both grant-free and grant-based transmission.

Figure 3:
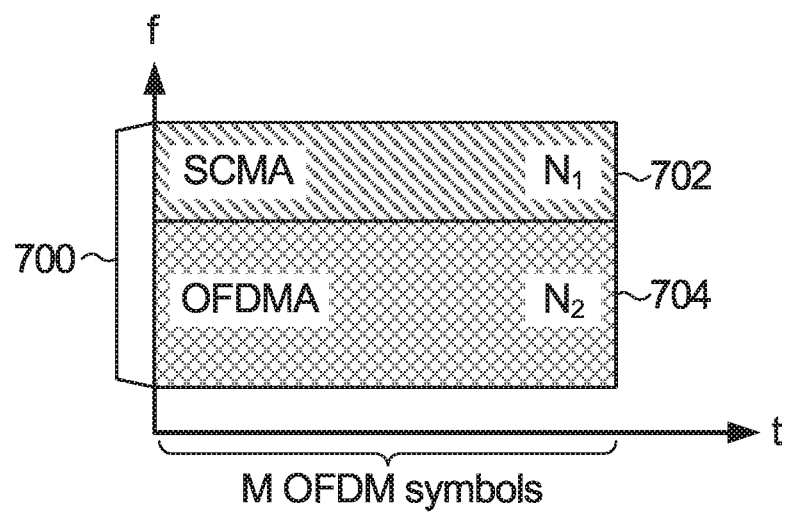
FIG. 3 shows TU size definitions for two access schemes with no overlap in accordance with another embodiment of the invention.

FIG. 3 shows an example of co-existence of SCMA with OFDMA in the same sub-band. In this example, the sub-band 700 is divided into a region 702 for SCMA, in which channelization is based on TUs (e.g. spreading blocks) with N subcarriers; and a region 704 for OFDMA, in which channelization is based on TUs (in this case resource blocks) having $N_2$ subcarriers. For the purpose of this example, region 702 is a single TU assigned to SCMA and region 704 is a single TU assigned to OFDMA. Both regions are M OFDM symbols in the time dimension. For the example of FIG. 3, the TUs are assigned to OFDMA and SCMA in a non-overlapping fashion.

$N_1$ and M together satisfy the constraints mentioned before for SCMA channelization, such that an integer number of spreading blocks fit within the TU. $N_1$ and $N_2$ can be independent. In particular, for a filtered OFDM based implementation which may not require a guard band between adjacent sub-bands, $N_1$ and M may be chosen such that $(kN_1+jN_2)\Delta f$ is close to or equal to the sub-band bandwidth, where $\Delta f$ is the sub-carrier spacing, $kN_1$ is the bandwidth of a set of k TUs each having $N_1$ sub-carriers in region 702, and $jN_2$ is the bandwidth of a set of j TUs each having $N_2$ sub-carriers in region 704.

Figure 4:
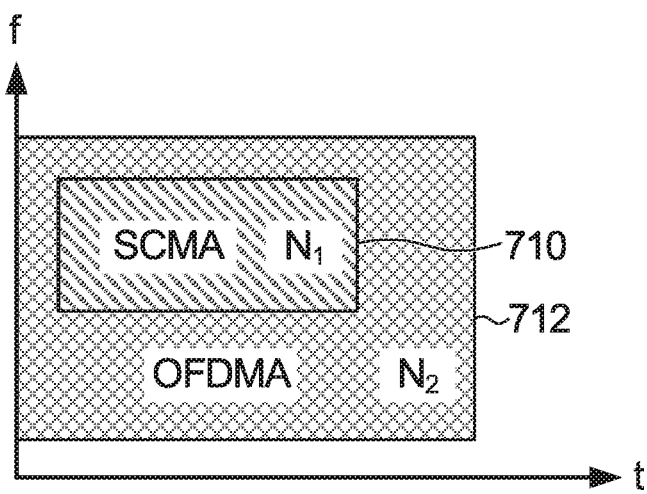
FIG. 4 shows TU size definitions for two access schemes with complete overlap in accordance with another embodiment of the invention.

FIG. 4 shows another example of co-existence of SCMA with OFDMA in a sub-band in an overlapping fashion. For this example, an SCMA region 710 is inside and completely overlapping an OFDMA region 712. For this example, channelization is based on TUs with $N_1$ subcarriers for SCMA region 710, and TUs with $N_2$ subcarriers for OFDMA region 712.

Different schemes can be employed at the receiver for decoding the received signal containing overlapping transmissions based on the grant-free access scheme and grant based access scheme. These are selected based on the particulars of the access schemes used. In the particular case of SCMA and OFDMA, a non-exhaustive set of options for detection of SCMA and OFDMA include:

- joint message passing algorithm (MPA) of OFDMA and SCMA layers over the intersection region and MPA over the SCMA-only region to generate the log-likelihood ratios (LLRs) and then forward error correction (FEC) decoding;
- Symbol-level successive interference cancellation (SIC)-MPA over the intersection region, finding the LLRs for both SCMA and OFDMA layers and then FEC decoding;
- FEC-level SIC-MPA: In this case, first determine the decoding order (SCMA layer first or OFDMA layer first). Based on the determined decoding order, determine the LLRs of the first layer to be decoded. Next, FEC decoding is performed based on the determined LLRs. If decoding is successful, the first layer to be decoded is removed from the received signal and the decoding process is repeated again for the second layer.

Figure 5A:
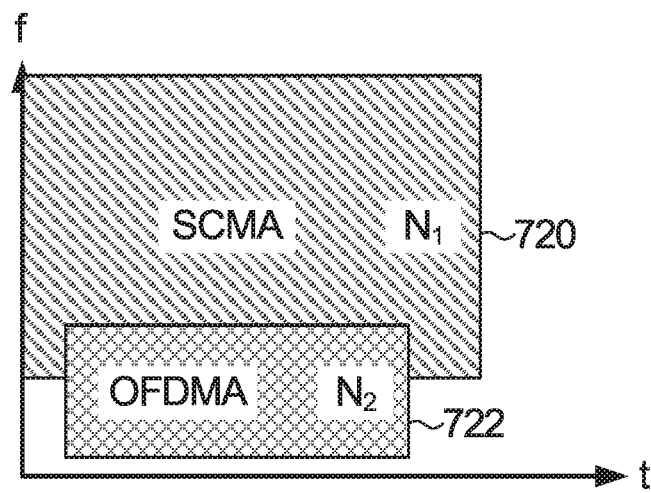
FIG. 5A shows TU size definitions for two access schemes with partial overlap in accordance with another embodiment of the invention.

Referring now to FIG. 5A, shown is another example of co-existence of SCMA with OFDMA in a same sub-band in a partially overlapping fashion. For this example, an SCMA region 720 is partially overlapping with an OFDMA region 722. For this example, channelization is based on TUs with $N_1$ subcarriers for SCMA region 710, and TUs with $N_2$ subcarriers for the OFDMA region 722.

Again, different schemes can be employed at the receiver for decoding the received signal containing overlapping transmissions based on the grant-free access scheme and grant based access scheme In this case, a non-exhaustive set of options includes:

- Joint MPA of OFDMA and SCMA layers over the intersection region and MPA over the SCMA-only region and quadrature amplitude modulation (QAM) demapping in the OFDMA-only region to generate the LLRs and then FEC decoding. The constraint for joint MPA is the number of tones in the intersection region should be divisible by the SCMA spreading factor;
- Symbol-level SIC-MPA over the intersection region, finding the LLRs for both SCMA and OFDMA layers and then FEC decoding; and
- FEC-level SIC-MPA: In this case, first determine the decoding order (SCMA layer first or OFDMA layer first), based on that try to find the LLRs of the first, then FEC decoder and then if decoding is successful, removing it from the received signal and do it again for the second signal.

Signaling

In some embodiments, signalling is employed to indicate different TU sizes. Such signaling for different TU sizes can be performed (transmitted and received) dynamically or semi-statically. In some embodiments, the TU sizes to use may be dynamically chosen by the scheduler in a time division multiplexed (TDM) and/or a frequency division multiplexed (FDM) fashion. For example, if a low latency packet needs to be scheduled, at the 11$^{th}$ symbol location of a 14-symbol sub-frame, the scheduling could be based on a three symbol TU. For example, in some embodiments, for some or all UEs, the UE may be assigned a certain channelization for a particular time horizon, and then a controller can notify the UE for possible TU size adaptation. In some embodiments, this is done depending on UE capability, for example whether or not the UE supports both slots and mini-slots. In other embodiments, for one or more UEs, signaling is fully dynamic, meaning that the signalling is sent each time resources are scheduled.

Alternatively, downlink control information (DCI) may include information for multiple TU sizes. In some embodiments, where there is a fixed pool of TU sizes, TU aggregation may be performed to effectively provide additional flexibility. In this case, the DCI may include information of aggregation of multiple TU sizes. In some embodiments, cross-numerology scheduling is employed, including information for multiple TU sizes. Consider an example in which a first TU is based on a 15 kHz numerology in a first sub-band, and a second TU is based on a 60 kHz numerology in a second sub-band. TU aggregation of the first and second TUs can be TDM based or FDM based spanning multiple sub-bands. A common DCI contains information of the TU sizes in the different sub-bands.

Figure 5B:
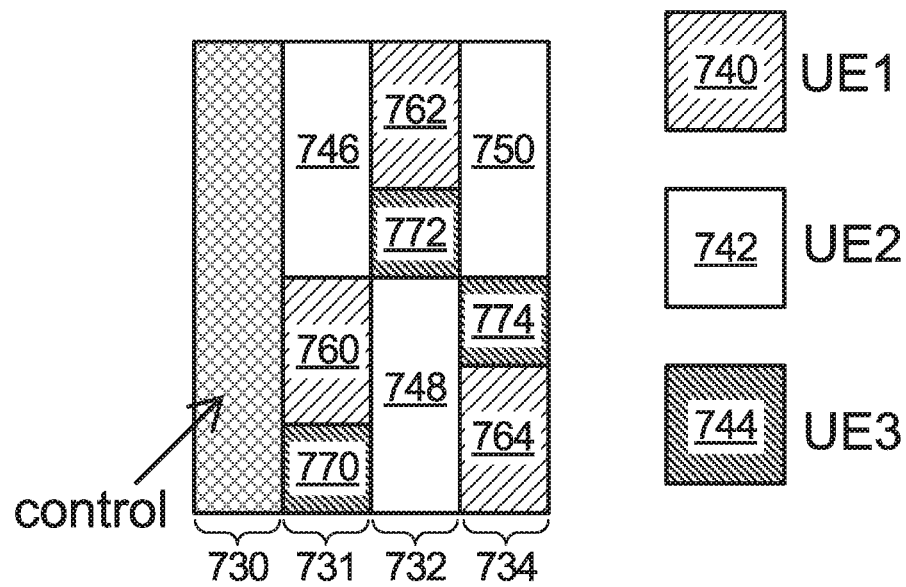
FIG. 5B shows TU size definitions and TU allocations within a frame structure.

In some embodiments, a control symbol format that allocates different TU sizes is used to provide configurability over both frequency and time. In a specific example, bandwidth is partitioned into L partitions based on N-subcarrier groups, and time is partitioned into K mini-slots based on M symbols. In some embodiments, M and/or K can be different for different UEs. More specifically, although the example shows mini-slots that are the same length, different length mini-slots can be employed. A respective bit in a bitmap can be used to schedule a TU for a UE in one or more contiguous N-subcarrier by M symbol regions. An example is shown in FIG. 5B, which shows time frequency resources including symbols 730 for control information, including a bitmap. In the time domain, the scheduling granularity is to a resolution of two OFDM symbols, so scheduling can be performed on any of K=3 mini-slots 731,732,734 each containing two OFDM symbols. In the frequency domain, the bandwidth is divided into L=10 N-subcarrier partitions. Individual subcarriers are not shown. For this specific example, a 3×10 bit bitmap can allocate an arbitrary combination of the N-subcarrier by two OFDM symbol regions. The allocations to first, second and third UEs are indicated at 740,742,744 respectively. For UE1, TUs are defined at 760,762,764, each of which is one mini-slot in duration and has 3 N-sub-carrier partitions. For UE2, TUs are defined at 746,748,750, each of which is one mini-slot in duration and has 5 N-sub-carrier partitions. For UE3, TUs are defined at 770,772,774, each of which is one mini-slot in duration and has 2 N-sub-carrier partitions.

The bitmap for the first UE could take the form of a K×L=3×10 bit bitmap, which can be expressed as a 30-bit sequence as in the example that follows:

010
010
010
000
000
100
100
100
000
000

In some embodiments, the control symbol format also includes an indication of K and L, which as indicated above, may differ for different UEs. For the example of FIG. 5B, for UE1, K=3 and L=10, and UE2, K=3, and L could equal 2, in which case a K×L=2×3 bitmap is used to signal the resources for UE2 as follows:

101
010

In some embodiments, TU assignment for grant-free contention based regions is performed semi-statically.

In some embodiments, the approaches described herein are used to allow one or more quality of service (QoS) requirements (e.g., latency and reliability for some MTC applications) to be simultaneously met.

Figure 5C:
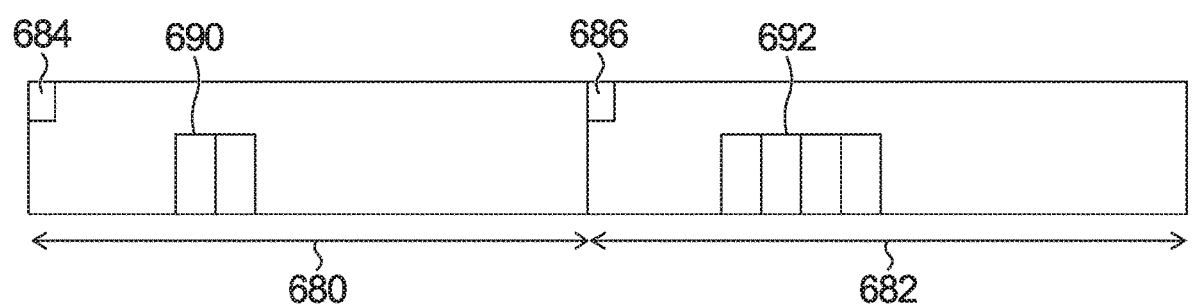
FIG. 5C shows an example of signalling TU size information at certain intervals.

In some embodiments, downlink control information indicating TU size is sent at certain intervals, and downlink control information containing TU allocation is sent together with the data. An example is shown in FIG. 5C which shows two TU update periods 680,682. The TU size information is conveyed at the start of each TU update period at 684,686. During the first TU size update period 680, a TU size covers two aggregated mini-slots, each mini-slot having two OFDM symbols, and is configured with the TU size information 684. A TU thus configured is indicated at 690. During the second TU size update period 682, a TU size covers four mini-slots aggregated is configured with the TU size information 686. A TU thus configured is indicated at 692.

More generally, in some embodiments, a slow DCI contains information of time-domain length of resource allocation, for example how many OFDM symbols the resource allocation would contain, and a fast DCI contains actual resource allocation for the duration. Advantageously, the fast DCI can impose a relatively lower overhead compared to transmitting the information indicating how many symbols have been scheduled, and the information indicating the actual resource allocation every time scheduling is performed. The slow DCI is slow in the sense that it is sent less frequently than the fast DCI. Slow DCI and fast DCI can be particularly advantageous when a very short time granularity is assigned.

Alternatively, TU size can be dynamically updated with regular downlink control information.

Figure 6A:
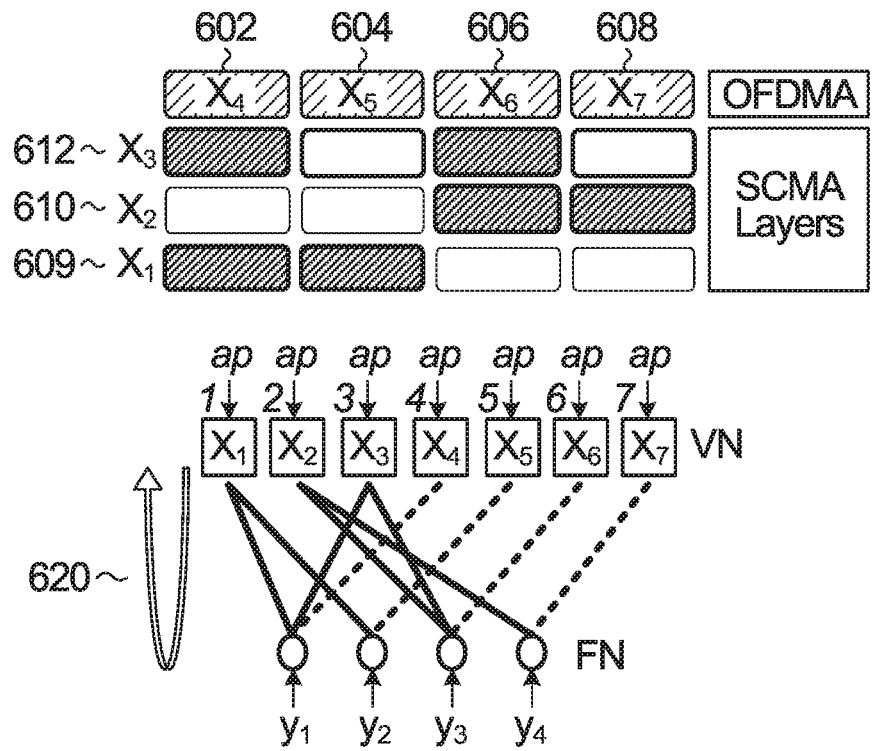
FIG. 6A is a diagram showing overlapping OFDMA and SCMA layers, and a factor graph for a message passing algorithm for decoding.

FIG. 6A depicts a first example of a receiver structure when SCMA and OFDMA layers co-exist in the same time-frequency plane. For the specific example shown, there are four tones shown as vertical columns 602,604,606,608. A transmission for OFDMA has four symbols $X_4, X_5, X_6, X_7$ transmitted using each of the four tones independently. A transmission for SCMA has three layers 609,610,612. In the first layer 609, symbol $X_1$ is transmitted on the first and second tones 602,604. In the second layer 610, symbol $X_2$ is transmitted on the third and fourth tones 606,608. In the third layer 912, symbol $X_3$ is transmitted on the first and third tones 602,606. This is intended to show a very specific example of co-existence of SCMA (more generally any non-orthogonal access scheme) and OFDMA.

In some embodiments, a joint message passing algorithm (MPA)-based receiver is used to process the co-existing signals. Joint MPA is a known method that has been used for code division multiple access (CDMA). In an MPA-based method, there is a factor graph where virtual nodes (VN) receive apriori information (ap) and represent layers and function nodes (FN) represent the tones of the block. MPA has been applied in an SCMA-only receiver that gives maximum likelihood (ML)-like performance.

In accordance with an embodiment of the invention, an MPA-based receiver is provided for processing co-existing signals (such as co-existing OFDMA and SCMA signals), featuring a modified factor graph that includes additional nodes for the OFDMA content. An example of such a modified factor graph for the co-existing signal example of FIG. 6A is indicated at 620. As noted above, here, a transmission for OFDMA has four data symbols mapped to four tones independently (this being just an example). In the factor graph, this is shown as connecting lines from $X_4$ to $y_1$, $X_5$ to $y_2$, $X_6$ to $y_3$ and $X_7$ to $y_4$. Note that unlike OFDMA, SCMA layers $X_1, X_2, X_3$ are mapped to more than one tone, due to spreading. Thus, in general, a factor graph can be generated in the usual way for SCMA, and then the OFDMA layer is accommodated by increasing the number of VNs to include one additional VN for each data symbol of the OFDMA layer. Once the factor graph is thus generated, it can be processed using a normal MPA receiver methodology.

Figure 6B:
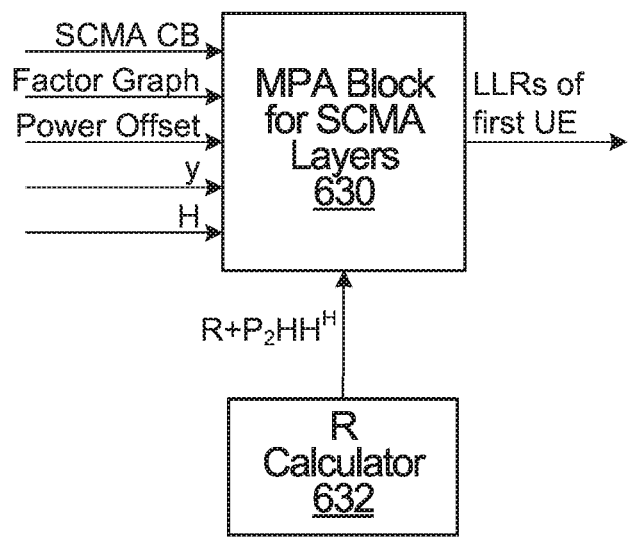
FIG. 6B is a block diagram of an message passing algorithm (MPA) decoder for SCMA layers.

In another example, a SIC-MPA based receiver is employed for processing the co-existing signals. This may, for example, be used in the case that joint MPA becomes too complex or if the receiver is not able to handle an increased number of VNs. In some embodiments, this method includes appropriate power offset among the OFDMA and SCMA layers. With this approach, the SCMA layers are decoded as in MPA, by treating the OFDMA layer as interference. After subtracting the successfully decoded SCMA layers, the OFDMA layer is decoded. When decoding SCMA, the noise and interference covariance matrix is updated and provided to the MPA block, along with other regular inputs. This example is depicted in FIG. 6B, where an MPA block for SCMA layers is indicated at 630. Inputs include the SCMA code blocks (CB), the factor graph, power offset, y=received signal strength of the SCMA block, H=composite channel of all layers of the SCMA block, and R=noise and external interference covariance matrix calculated by R calculator 632. As mentioned above, when decoding SCMA, the noise and interference covariance matrix is updated. $R+P_2HH^H$ is the updated covariance matrix, in which:

R denotes noise and interference from other cells;

the second term $P_2HH^H$ captures the covariance matrix of the OFDMA layers sharing the same resources as the SCMA layers; and P2 is power used for OFDMA layers.

Figure 7:
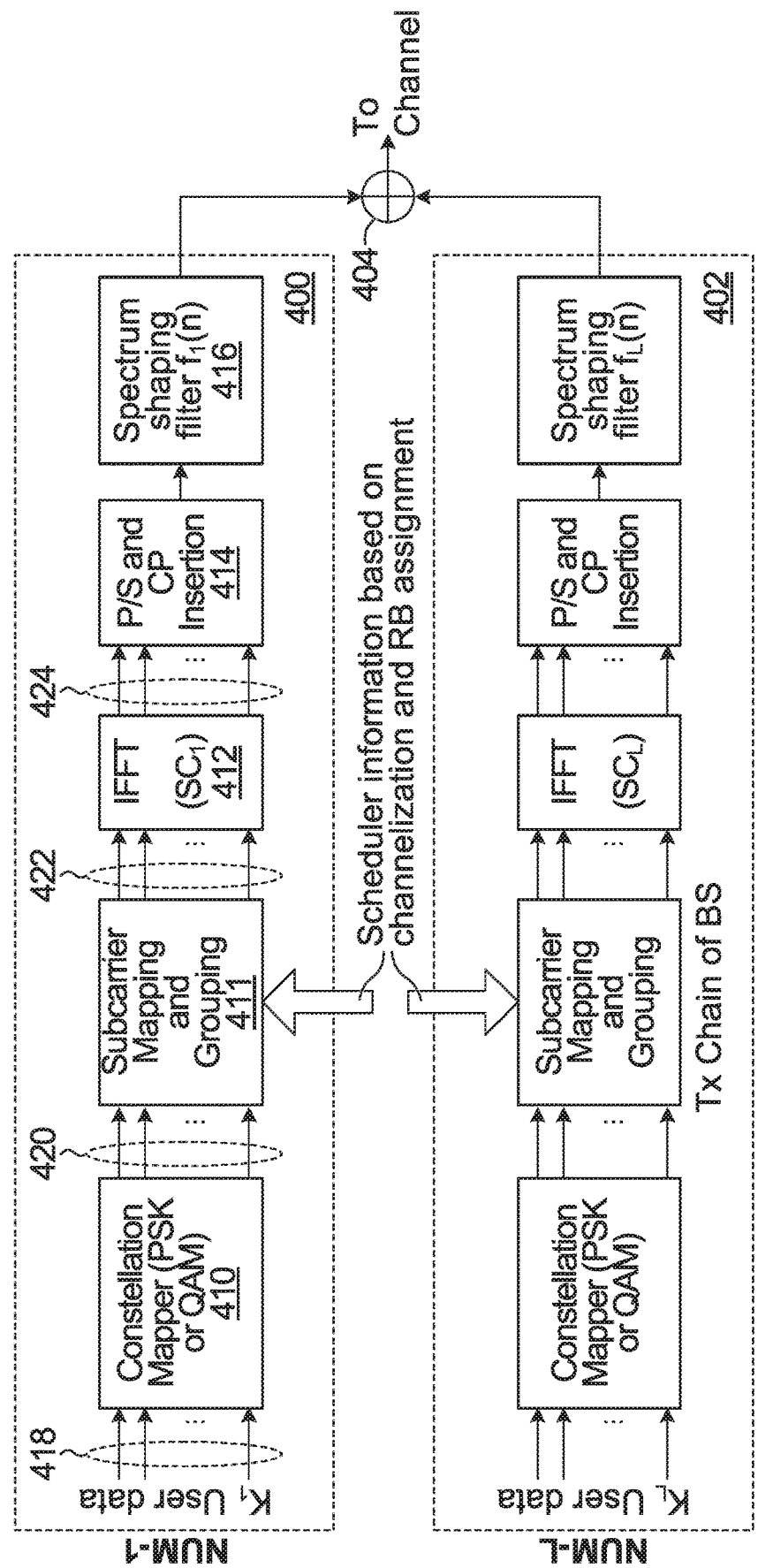
FIG. 7 is a block diagram of a transmitter for transmitting with configurable TU sizes for multiple access schemes.

Referring now to FIG. 7, shown is an example simplified block diagram of part of a transmitter that can be used to perform channelization as described above. In this example, there are L supported numerologies, where L>=2.

Figure 9:
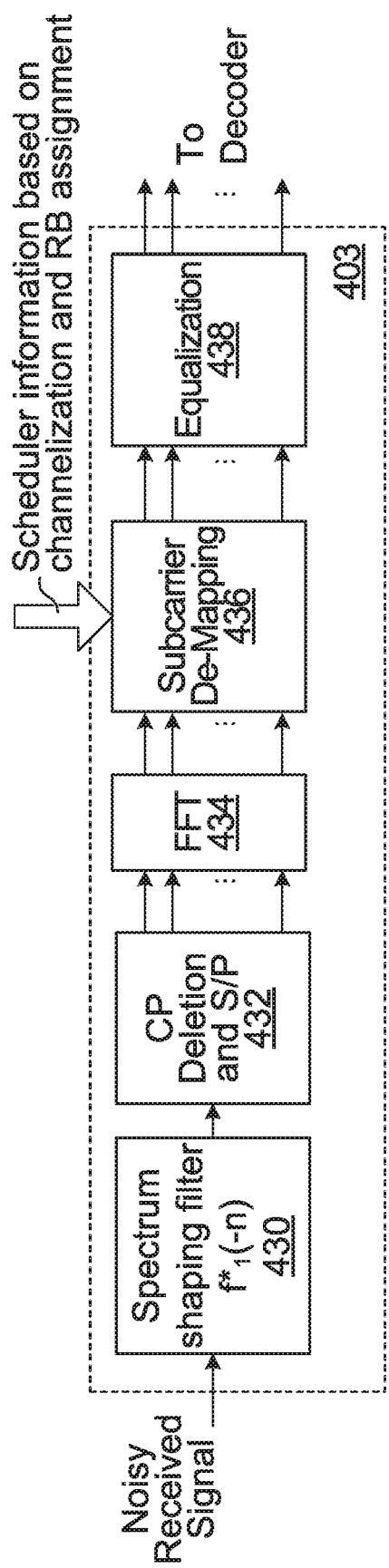
FIG. 9 is a simplified block diagram of a receive chain for a user equipment operating with the first numerology.

For each numerology, there is a respective transmit chain 400,402. FIG. 7 shows simplified functionality for the first and Lth numerology; the functionality for other numerologies would be similar. Also shown in FIG. 9 is simplified functionality for a receive chain 403 for a receiver operating using the first numerology.

The transmit chain 400 for the first numerology includes a constellation mapper 410, subcarrier mapping and grouping block 411, IFFT 412 with subcarrier spacing $SC_1$, pilot symbol and cyclic prefix insertion 414, and spectrum shaping filter 416. In operation, constellation mapper 410 receives UE data (more generally, UE content containing data and/or signalling after encoding) for $K_1$ UEs, where $K_1>=1$. The constellation mapper 410 maps the UE data for each of the $K_1$ UEs to a respective stream of constellation symbols and outputs an indication of the mapping at 420. The number of UE bits per symbol depends on the particular constellation employed by the constellation mapper 410. In the example of QAM, $2^n$ bits from for each UE are mapped to a respective QAM symbol.

For each OFDM symbol period, the subcarrier mapping and grouping block 411 groups and maps the constellation symbols produced by the constellation mapper 410 to up to P inputs of the IFFT 412 at 422. The grouping and mapping is performed based on scheduler information which in turn is based on channelization and resource block assignment, in accordance with a defined resource block definition and allocation for the content of the $K_1$ UEs being processed in transmit chain 400. P is the size of the IFFT 412. Not all of the P inputs are necessarily used for each OFDM symbol period. The IFFT 412 receives up to P symbols, and outputs P time domain samples at 424. Following this, in some implementations, time domain pilot symbols are inserted and a cyclic prefix is added in block 414. The block 416 is a spectrum shaping filter $f_1(n)$ which limits the spectrum at the output of the transmit chain 400 to mitigate interference with the outputs of other transmit chains such as transmit chain 402. The spectrum shaping filter 416 also performs shifting of each sub-band to its assigned frequency location.

The functionality of the other transmit chains, such as transmit chain 402, is similar. The outputs of all of the transmit chains are combined in a combiner 404 before transmission on the channel.

The subcarrier mapping and grouping block 411 of FIG. 7 groups and maps the constellation symbols based on the resource block definition(s) and scheduling. Once a resource block definition for a given UE is established, scheduling is used to decide where in time and frequency the UE's resource blocks will be transmitted.

The system of FIG. 7 can be used to implement coexisting SCMA (or another non-orthogonal multiple access scheme) and OFDMA downlink transmission. Each individual module 400 or 402 can output either SCMA or OFDMA or a combination. SCMA mapping to codebooks is done using the constellation mapper 410. The output, depending on spreading factor, is then assigned to one or a group of sub-carriers by the subcarrier mapper 411.

Figure 8A:
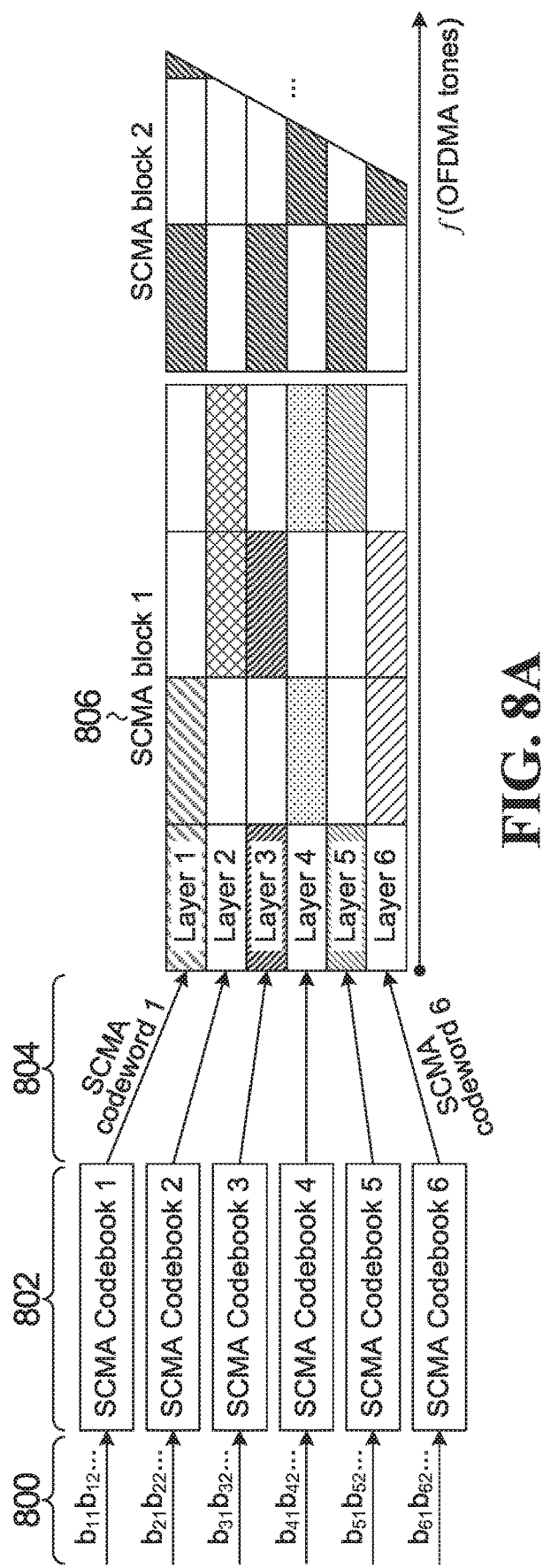
FIG. 8A shows an example of SCMA codewords mapped to OFDM tones.

FIG. 8A is a first example of subcarrier mapping in which the mapping produces an SCMA output. Six input streams 800 are mapped using six SCMA codebooks 802 to six SCMA codewords 806. These are mapped to six layers of an SCMA block 808 that spans four subcarriers, i.e., spreading factor of four.

Figure 8B:
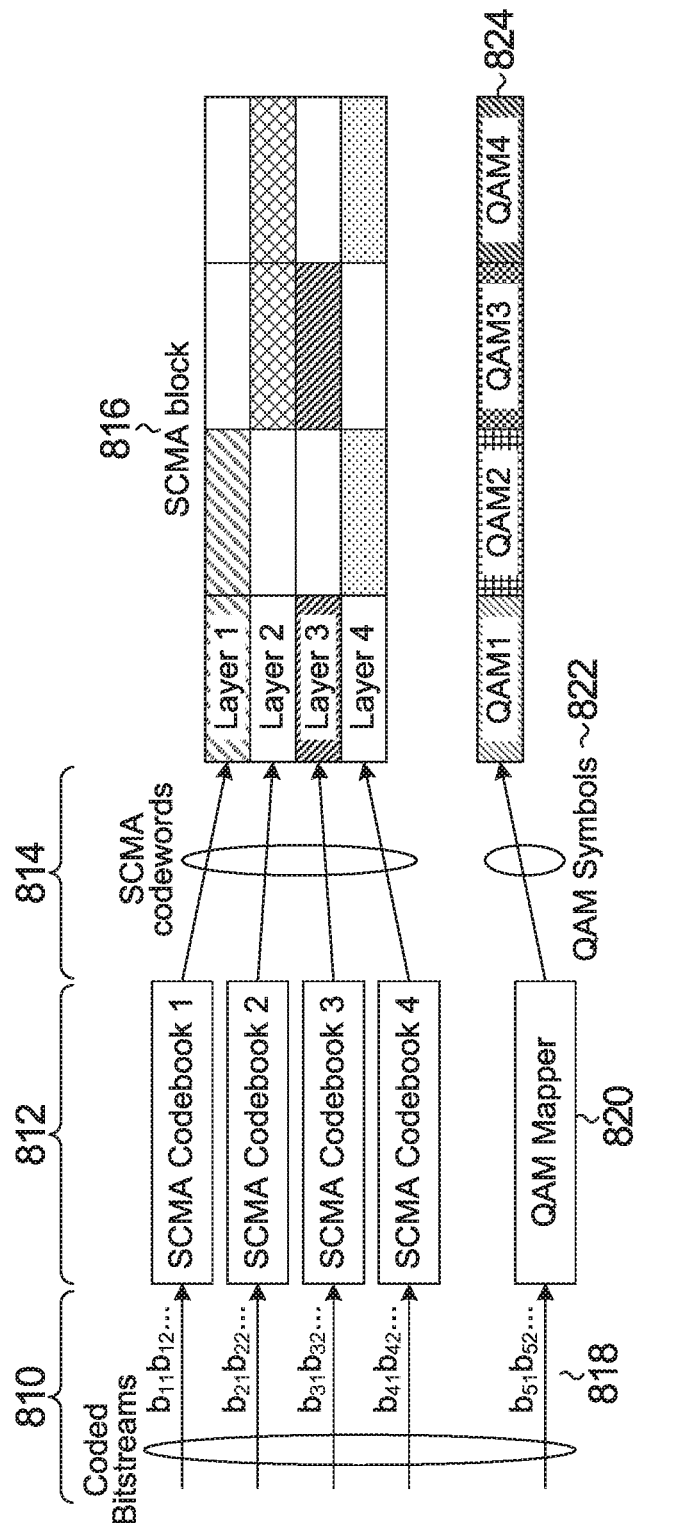
FIG. 8B shows an example of SCMA codewords and QAM symbols mapped to OFDM tones.

FIG. 8B is a second example of subcarrier mapping in which the mapping produces an SCMA+OFDMA output. four input streams 810 are mapped using four SCMA codebooks 812 to four SCMA codewords 814. These are mapped to four layers of an SCMA block 816 that spans four subcarriers. In addition, a QAM mapper 820 maps input stream 818 to QAM symbols 822 which are mapped to the same OFDM tones at 824. The SCMA block 618 and the OFDMA content are combined prior to IFFT processing.

FIG. 9 shows a simplified block diagram of a receive chain for a user equipment operating with the first numerology depicted at 403. In some embodiments, a given user equipment is permanently configured to operate with a particular numerology. In some embodiments, a given user equipment operates with a configurable numerology. In either case, flexible TU definitions are supported by the user equipment. The receive chain 403 includes spectrum shaping filter 430, cyclic prefix deletion and pilot symbol processing 432, fast Fourier transform (FFT) 434, subcarrier de-mapping 436 and equalizer 438. Each element in the receive chain performs corresponding reverse operations to those performed in the transmit chain. The receive chain for a user equipment operating with another numerology would be similar.

In FIG. 9, the equalization block 438 includes a variety of functions that generate soft bit information depending on the specific receiver implementation, including for example one or a combination of:
- the SIC MPA block of FIG. 6B for use for SCMA with or without OFDMA;
- an MPA block for SCMA;
- a joint MPA block for SCMA with OFDMA such as described by way of example with reference to FIG. 6A;
- a minimum mean square error (MMSE) detection block for OFDMA.

These are examples only. The equalization block 438 outputs LLRs to the decoder, which produces hard bit information.

Downlink

The embodiments have been described in the context of uplink transmissions. In some embodiments, the same approach is used for downlink transmissions. In some such embodiments, for downlink transmissions, in an area of superposition between first and second TUs, when the second TU is not needed, the entire first TU is used, whereas when the second TU is needed, the first TU is punctured in the area of overlap. In some embodiments, a smaller TU size, for example 3 or 4 symbols, may puncture a larger TU size, for example a slot or sub-frame. In other embodiments, for downlink transmissions, the additional traffic is superimposed with power adjustment. These TUs may alternatively be used for contention based traffic.

In some embodiments, for downlink transmissions, depending on whether there is any overlap, the base station notifies the UE in the downlink of the decoder type that it needs to use and over which region. This information may be conveyed in a control channel.

In some embodiments, for downlink transmission, different TU sizes are employed with no overlap.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in an access network comprising:
within a system bandwidth, assigning a first time-frequency resource for transmissions from a first UE using a grant-based access scheme based on a minimum transmit unit (TU) size constraint of the grant-based access scheme and assigning a second time-frequency resource for transmissions of a second UE using a grant-free access scheme based on a minimum TU size constraint for the grant-free access scheme, the minimum TU size constraint for the grant-free access scheme requiring a different time duration than the minimum TU size constraint for the grant-based access scheme;
receiving a first transmission from the first UE over the first time-frequency resource in accordance with the grant-based access scheme; and
receiving a second transmission from the second UE over the second time-frequency resource in accordance with the grant-free access scheme.

2. The method of claim 1, wherein at least one of the grant-based access scheme and the grant-free access scheme is a non-orthogonal multiple-access scheme.

3. The method of claim 2, wherein the non-orthogonal multiple-access scheme uses spreading of a data symbol over multiple resource elements.

4. The method of claim 1, further comprising at least one of:
   transmitting signalling indicating a time duration required by the minimum TU size constraint for the grant-based access scheme in time and/or frequency; and
   transmitting signalling indicating a time duration required by the minimum TU size constraint for the grant-free access scheme in time and/or frequency.

5. The method of claim 4, wherein at least one of the minimum TU size constraint for the grant-based access scheme and the minimum TU size constraint for the grant-free access scheme is signalled statically, semi-statically, or dynamically.

6. The method of claim 1, wherein the grant-based access scheme is an orthogonal frequency division multiple access (OFDMA) multiple access scheme, and the grant-free access scheme is a non-orthogonal multiple access scheme.

7. The method of claim 6, wherein the non-orthogonal multiple access scheme is one of SCMA (sparse code multiple access), pattern division multiple access (PDMA), multi-user shared access (MUSA), and resource spread multiple access (RSMA).

8. The method of claim 1, wherein the second transmission is received using spreading blocks having a spreading block size, and the second time-frequency resource has a useful size that is an integer multiple of the spreading block size.

9. The method of claim 1, wherein a time duration of the first time-frequency resource is an integer multiple of a time duration the second time-frequency resource.

10. The method of claim 1, wherein the first time-frequency resource and the second time-frequency resource are disjoint.

11. The method of claim 1, wherein the first time-frequency resource partially overlaps with the second time-frequency resource.

12. The method of claim 1, wherein all of the second time-frequency resource overlaps with the first time-frequency resource.

13. The method of claim 12, wherein the first transmission is received over a first carrier having a first sub-carrier spacing, and the second transmission is received over a second carrier having a second sub-carrier spacing that is different than the first sub-carrier spacing.

14. The method of claim 1, wherein the first time-frequency resource is statically assigned, semi-statically assigned, or dynamically assigned and the second time-frequency resource is statically assigned, semi-statically assigned, or dynamically assigned.

15. The method of claim 1, further comprising:
   transmitting signaling containing definitions of the time-frequency resources.

16. The method of claim 11, further comprising:
   performing joint decoding for portions of the first transmission and the second transmission that span overlapping time-frequency resources.

17. The method of claim 16, further comprising:
   using a message passing algorithm to decode the second transmission;
   subtracting an interference component from the first transmission based on a result of the decoding of the second transmission; and
   decoding a residual of the first transmission after subtracting the interference component from the first transmission.

18. An apparatus comprising:
   a processor; and a non-transitory computer readable storage medium storing programming for execution by the processor, the programming including instructions to:
      within a system bandwidth, assign a first time-frequency resource for transmissions from a first UE using a grant-based access scheme based on a minimum transmit unit (TU) size constraint of the grant-based access scheme and assigning a second time-frequency resource for transmissions of a second UE using a grant-free access scheme based on a minimum TU size constraint for the grant-free access scheme, the minimum TU size constraint for the grant-free access scheme requiring a different time duration than the minimum TU size constraint for the grant-based access scheme;
      receive a first transmission from the first UE over the first time-frequency resource in accordance with the grant-based access scheme; and
      receive a second transmission from the second UE over the second time-frequency resource in accordance with the grant-free access scheme.

19. The apparatus of claim 18, wherein at least one of the grant-based access scheme and the grant-free access scheme is a non-orthogonal multiple-access scheme.

20. The apparatus of claim 19, wherein the non-orthogonal multiple-access scheme uses spreading of a data symbol over multiple resource elements.

21. The apparatus of claim 18, wherein the grant-based access scheme is an orthogonal frequency division multiple access (OFDMA) multiple access scheme, and the grant-free access scheme is a non-orthogonal multiple access scheme.

22. The apparatus of claim 21, wherein the non-orthogonal multiple access scheme is one of SCMA (sparse code multiple access), pattern division multiple access (PDMA), multi-user shared access (MUSA), and resource spread multiple access (RSMA).

23. The apparatus of claim 18, wherein the second transmission is received using spreading blocks having a spreading block size, and the second time-frequency resource has a useful size that is an integer multiple of the spreading block size.

24. The apparatus of claim 18, wherein a time duration of the first time-frequency resource is an integer multiple of a time duration the second time-frequency resource.

25. The apparatus of claim 18, wherein the first time-frequency resource and the second time-frequency resource are disjoint.

26. The apparatus of claim 18, wherein the first time-frequency resource partially overlaps with the second time-frequency resource.

27. The apparatus of claim 18, wherein all of the second time-frequency resource overlaps with the first time-frequency resource.

28. The apparatus of claim 18, wherein the first transmission is received over a first carrier having a first sub-carrier spacing, and the second transmission is received over a second carrier having a second sub-carrier spacing that is different than the first sub-carrier spacing.

29. The apparatus of claim 18, wherein the programming further includes instructions to:
   perform joint decoding for portions of the first transmission and the second transmission that span overlapping time-frequency resources.

30. The apparatus of claim 18, wherein the programming further includes instructions to:
   use a message passing algorithm to decode the second transmission;

subtract an interference component from the first transmission based on a result of the decoding of the second transmission; and
decode a residual of the first transmission after subtracting the interference component from the first transmission.

* * * * *